US007640187B1

(12) United States Patent
Sonderegger et al.

(10) Patent No.: US 7,640,187 B1
(45) Date of Patent: Dec. 29, 2009

(54) ANONYMOUS SHOPPING TRANSACTIONS ON A NETWORK THROUGH INFORMATION BROKER SERVICES

(75) Inventors: Kelly Irvin Sonderegger, Santaquin, UT (US); Russell T. Young, Pleasant Grove, UT (US); John M. Robertson, Pleasant Grove, UT (US); Arn D. Perkins, Alpine, UT (US)

(73) Assignee: Novell, Inc., Provo, UT (US)

( * ) Notice: Subject to any disclaimer, the term of this patent is extended or adjusted under 35 U.S.C. 154(b) by 672 days.

(21) Appl. No.: 09/821,040

(22) Filed: Mar. 30, 2001

(51) Int. Cl.
*G06Q 30/00* (2006.01)
(52) U.S. Cl. .......................... 705/26; 705/27
(58) Field of Classification Search ............. 705/26–27
See application file for complete search history.

(56) References Cited

U.S. PATENT DOCUMENTS

| | | | | |
|---|---|---|---|---|
| 5,758,126 | A | * | 5/1998 | Daniels et al. ............. 715/780 |
| 5,953,707 | A | * | 9/1999 | Huang et al. ................. 705/10 |
| 5,970,466 | A | * | 10/1999 | Detjen et al. .................... 705/8 |
| 6,000,832 | A | | 12/1999 | Franklin et al. ........ 364/479.02 |
| 6,058,381 | A | * | 5/2000 | Nelson ........................ 705/40 |
| 7,069,249 | B2 | * | 6/2006 | Stolfo et al. .................. 705/74 |
| 7,203,315 | B1 | * | 4/2007 | Livesay ...................... 380/255 |
| 2001/0029485 | A1 | * | 10/2001 | Brody et al. .................. 705/39 |
| 2001/0044785 | A1 | * | 11/2001 | Stolfo et al. .................. 705/74 |

FOREIGN PATENT DOCUMENTS

| WO | WO 99/49424 | * | 9/1999 |
|---|---|---|---|
| WO | WO 99/66428 | * | 12/1999 |

OTHER PUBLICATIONS

Novell: "Novell's Digitalme and NDS eDirectory for Consumers to Streamline their online purchases," PR Newswire, Mar. 29, 2000, Proquest #52024806, 3pgs.*
Novell: "Novell Tries to make e-commerce, privacy compatible—system allows users to set limits on information disclosed," Satran, Dick; Seattle Times, Apr. 14, 1999, p. D.5, Proquest #40548330, 3pgs.*
Novell: "Passwords-who need 'em? Digital wallets help shoppers," Spector et al., PC World, Mar. 2000, v18i3p. 70, Proquest #49848563, 3pgs.*
Novell: "Novell provides privacy, directory services at same time," The Daily Yomiuri, Apr. 27, 1999, Proquest #40880863, 3pgs.*
UU: Novell: "Microsoft and Novell compete in creating single Internet sign-of for your e-shopping," McClure et al., InfoWorld, Nov. 15, 1999, v21i46p. 66, Proquest #46483507, 2pgs.*

* cited by examiner

*Primary Examiner*—Robert M. Pond
(74) *Attorney, Agent, or Firm*—Pillsbury Winthrop Shaw Pittman LLP

(57) ABSTRACT

A system and method for enabling a user to transact an anonymous on-line transaction, wherein a form of on-line payment is requested at a transaction interface is disclosed. The method may include providing an anonymous user interface that enables a user to initiate an on-line payment, accessing a first profile comprising user data when the user activates the form of on-line payment, generating a second profile linked to the first profile wherein, the second profile comprises anonymous data, and communicating the anonymous data from the second profile to the transaction interface to enable completion of the transaction.

7 Claims, 3 Drawing Sheets

ANONYMOUS SHOPPING TRANSACTIONS ON A NETWORK THROUGH INFORMATION BROKER SERVICES

FIELD OF THE INVENTION

This invention relates to a system and method for carrying out anonymous shopping and other on-line transactions over a network through the use of information broker services.

BACKGROUND OF THE INVENTION

The rise in the popularity of interconnected, processor-based networks, such as the Internet, has increased the practice of on-line shopping. The increase of on-line shopping has made it possible for consumers to purchase goods and services with ease. Often, consumers are able to purchase items from the convenience of their own home at any hour of the day.

However, in order to complete an on-line transaction, users are typically required to submit personal, confidential, or otherwise private information over the network to the on-line merchant. Once submitted, the information may be intercepted or otherwise accessed by unintended or unauthorized persons. Obviously, this is an undesirable result. Thus, it is desirable to carry out on-line transactions without needlessly endangering private information.

For example, buyers are typically required to submit a credit card number to the on-line merchant in order to pay for the desired goods or services. However, submitting a credit card number over the network opens the possibility that the credit card number will fall into the wrong hands and unauthorized charges may result.

Buyers are also asked to provide their legal names (usually as it appears on the credit card account). For numerous reasons, buyers may not want to provide their real name over the network. For example, for safety reasons, women living alone may not want to provide their real names. Similarly, buyers may not want to provide their home address when purchasing items on-line.

These and other drawbacks exist.

SUMMARY OF THE INVENTION

One advantage of the invention is that it overcomes these and other drawbacks in existing devices.

Another advantage is that the invention provides a system and method for enabling consumers to shop on-line without having to reveal personal information.

Another advantage is that the invention provides a system and method for using an information broker service to disguise a user's personal information and enable the user to accomplish on-line shopping in an anonymous fashion.

According to one aspect of the invention, there is provided a method for enabling a user to transact an anonymous on-line transaction, wherein a form of on-line payment is requested at a transaction interface. The method may include providing an anonymous user interface that enables a user to initiate an on-line payment, accessing a first profile comprising user data when the user activates the form of on-line payment, generating a second profile linked to the first profile wherein, the second profile comprises anonymous data, and communicating the anonymous data from the second profile to the transaction interface to enable completion of the transaction.

According to another aspect of the invention, there is provided a system for enabling a user to transact an anonymous on-line transaction, wherein a form of on-line payment is requested at a transaction interface. The system may include an anonymous user interface that enables a user to initiate an on-line payment, a profile access initiator that accesses a first profile comprising user data when the user activates the form of on-line payment, a profile generator that generates a second profile linked to the first profile wherein, the second profile comprises anonymous data, and an anonymous data communicator that communicates the anonymous data from the second profile to the transaction interface to enable completion of the transaction.

Other advantages and features of the invention will be apparent to those of skill in the art from the following description.

DETAILED DESCRIPTION OF THE PREFERRED EMBODIMENTS

Figure 1:
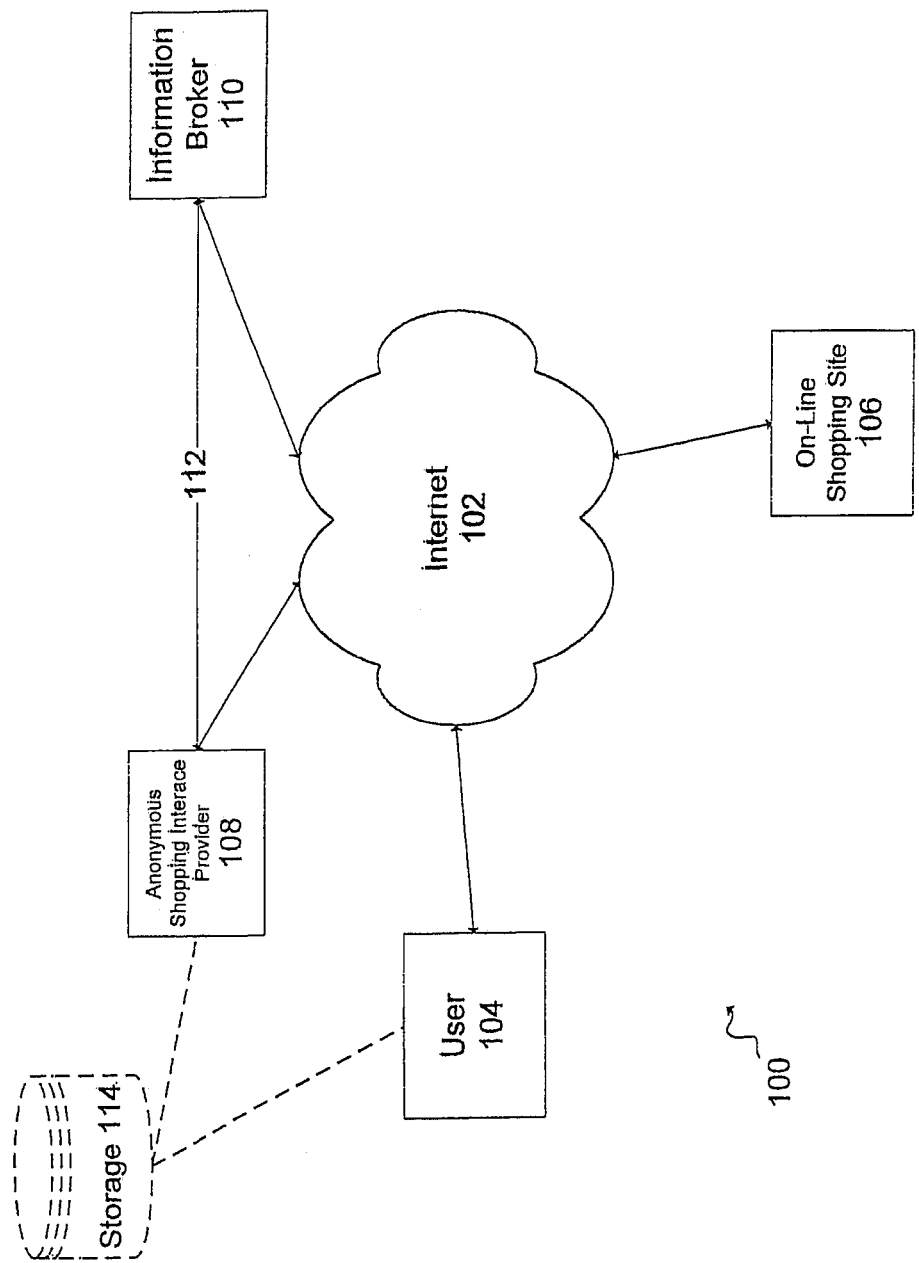
FIG. 1 is a schematic of the overall system according to one embodiment of the invention.

Operation of the invention may be described with reference to the following example embodiments. One embodiment applies to, among other things, the situation when a user wants to buy products on the Internet without supplying their credit card number. In this situation, a credit card issuer (e.g., a bank, credit union, or other credit card issuing entity) acts as an information broker and supplies a single-use credit card number for the user to use while conducting an on-line transaction on the Internet site. The Internet site receives and processes the single-use number the same as any other credit card number. The credit card issuer treats the card as a transaction card (i.e., single-use) as long as certain security criteria (explained below) are met.

For example, the above embodiment may be implemented as follows. A user's Internet browser interface may be adapted to include an anonymous shopper interface. The anonymous shopper interface may contain a representation (e.g., graphic image) of a credit card. When the user comes to the purchase point, or other request for a form of on-line payment, during his/her on-line shopping transaction he/she may activate the anonymous shopper interface credit card to complete the purchase. In some embodiments, activating the anonymous shopper card may activate a form fill-in procedure that reads the amount of the transaction (i.e., the amount of the purchase and any shipping, tax or other additional costs) and uses that amount to complete other transaction procedures as described below.

Activation of a form of on-line payment via the anonymous shopping interface may cause a profile access module to initiate access to a stored profile that a user may store containing credit card information corresponding to the credit card account for which the user wants the on-line transaction charges to ultimately be debited. For example, the stored profile may include the user's name, address, credit card account number, account expiration date, and any other information helpful for accomplishing on-line shopping. The profile may be stored at any suitable location. For example, the profile may be stored with the anonymous shopper interface provider, the credit card issuer, the user (e.g., in the user's hard drive), or any other suitable location. Regardless of storage location, upon activation via the anonymous shopper interface, the profile is retrieved for further use in the on-line transaction as described below.

The amount of the transaction and the stored profile information are then communicated through a secured line to the credit card issuer or other information broker. The secured line prevents unauthorized access to the user's private information.

The invention provides a transaction number generator software module for use by the credit card issuer or other information broker processing center. The number generator module generates a single use anonymous transaction number, associated with the user's credit card account, that functions as a "normal" credit card number. The anonymous transaction number is returned over the secured line and filled-in as card credit card number to complete the on-line shopping transaction.

Thus, instead of exposing the user's credit card number, the credit card issuer issues an anonymous per transaction credit card account with a purchase limit based on the transaction amount and an expiration date based on the month/year that the transaction takes place.

This means that the credit card issuer can issue at least one trillion unique credit cards per month. If that limit is hit, some of the numbers in the first four numbers of the user's credit card may be used to create a new limit of one trillion transactions per week.

The user's actual credit card number is never sent over the Internet. The only transmission of the actual credit card number occurs between the anonymous shopper interface and the credit card issuer over a secure private connection. In this manner, the user removes much of the risk of unauthorized use of their credit card. The credit card issuer also reduces their risk of someone stealing the credit card.

Another aspect of the invention applies to the situation when a user wants to conduct a transaction on the Internet without giving out their real name. Currently, users must use their real, or legal, name when supplying their payment and/or shipping information. One embodiment of the invention allows a user to associate an alias or fake name with the selected form of on-line payment (e.g., a single-use credit card).

The alias may be created in any suitable fashion. For example, the alias may be created by the user and stored in a profile. Alternatively, the user may be prompted to submit an alias as part of the request for a single-use transaction number. In any event, the alias name is transmitted to the on-line shopping site (e.g., through auto-form fill) as the name of the credit card account holder. In this manner, the site completes the on-line transaction using the alias name and the user never transmits his/her real name over the Internet.

Another aspect of the invention applies to situations when the customer wants to conduct a transaction anonymously without having to provide a home shipping address. In such a scenario, the invention enables a delivery service (e.g., U.S. Postal Service, UPS, Federal Express, etc.) to act as an information broker for the shipping address.

For example, the above embodiment may be implemented as follows. An anonymous shopper interface may include a representation of a delivery service logo or other identifier. When presented a delivery address request form, the user may select the desired delivery service logo in the anonymous shopper interface. Selecting the delivery service logo sends the delivery address request, along with a user identifier, to the anonymous shopper interface provider.

A user identifier may comprise any identifier that will uniquely correspond to the user. For example, a user identifier may comprise a uniform resource locator (URL), a domain name, an email address, a globally unique identifier (GUID), or other unique identifier.

The anonymous shopper interface provider verifies the user identity (e.g., using a password or other authentication scheme) and retrieves the user's address, billing and other information that the delivery service needs to complete the transaction.

Communication between the anonymous shopper interface and the delivery service is conducted over a private-secure connection. Upon receipt of the request, the delivery service generates an anonymous address. For example, the anonymous address may comprise the address of a delivery service hub station with a special routing code embedded in the address.

The anonymous shopper interface inserts the anonymous address into the on-line shopping site's shipping address form (e.g., through auto-form fill). The on-line shopping site sends the user's items to the anonymous address in the same manner as any other address. When the user's package reaches delivery service hub station address, the delivery service recognizes the anonymous address and routes delivery to the user's real address. In this manner, the user can shop on-line without fear of revealing private information such as a home address.

The above embodiments are but a few examples of the invention. Other applications and embodiments will be apparent to those of skill in the art upon reading the following detailed description of the figures.

FIG. 1 shows a schematic of the overall system 100 according to an embodiment of the invention. As shown, the various parties involved in on-line shopping interact through the medium provided by the Internet 102. Those parties may include, users 104, on-line shopping sites 106, anonymous shopping interface providers 108, and information brokers 110.

As described above, users 104 includes persons interested in carrying out an on-line shopping transaction. Users 104 may comprise private individuals, businesses, government entities, or other organizations.

On-line shopping sites 106 may include any Internet site that enables a user 104 to order, purchase, lease, or otherwise obtain, goods or services over the Internet 102.

Anonymous shopping interface provider 108 represents the entity or entities that provide the anonymous shopping interface 200 described herein. For example, anonymous shopping interface provider 108 may comprise software providers, Internet service providers, or a combination of these and other computer related service providers. As described above, the anonymous shopping interface provider 108 provides the user 104 with an anonymous shopping interface 200 that enables the user to carry out an anonymous on-line shopping transaction.

Information broker 110 represents the entity or entities that provide the information that enables the user to complete an anonymous on-line shopping transaction. For example, for embodiments where a user wishes to shop with an anonymous credit card account, information broker 110 may comprise a bank, credit union, or other financial institution that issues credit card accounts. Similarly, for embodiments where a user wishes to shop with an anonymous address, information broker 110 may comprise a post office, package delivery service, or other delivery service. Of course, for any given transaction information broker 110 may comprise more than one type of entity (e.g., a bank and a delivery service).

As described herein, anonymous shopping interface provider 108 and information broker 110 communicate over a secure communication link 112. Secure communication link 112 may comprise any suitable communication link having appropriate security guarantees. For example, secure communication link 112 may comprise a credit card authorization network, a secure satellite communication link, a secure telephone communication link, a secure computer network connection, or other secure communication link.

As described above, some embodiments of the invention may comprise a user profile that is stored at a conveniently accessible region. For example, profiles may be stored at storage device 114. Storage device 114 may comprise any suitable storage device capable of storing user profile information. For example, storage device may comprise a database storage system, a hard drive storage system, or the like.

As indicated by the dashed lines in FIG. 1, communication between storage device 114 and the rest of system 100 may be accomplished in a number of different fashions. For example, storage device 114 may comprise a hard drive storage system in communication with user 104, a database storage device in communication with anonymous shopping interface provider 108, or some other storage scheme may be implemented.

Figure 2:
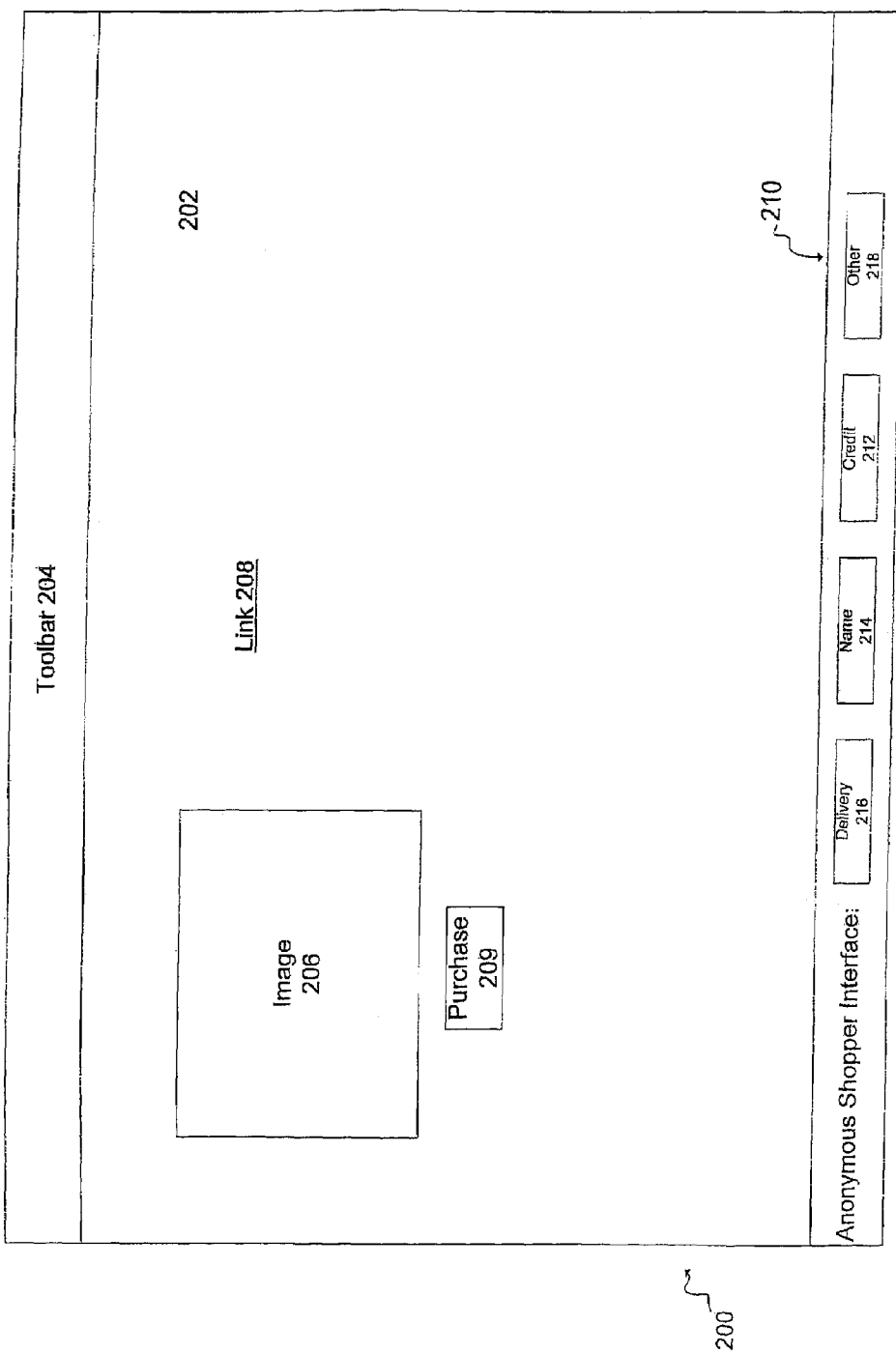
FIG. 2 is a schematic of an anonymous shopping interface according to one embodiment of the invention.

FIG. 2 is a schematic representation of an anonymous shopper interface 200 according to one embodiment of the invention. As shown, a user may browse the Internet using a suitable browser interface 202. For example, browser interface 202 may comprise a browser such as Netscape Navigator,™ Microsoft Internet Explorer,™ America On-Line™ browser or other suitable interface.

Browser 202 operates in a known manner and may comprise a toolbar 204 that allows a user to perform various browsing tasks (e.g., forward, back, print, refresh, home, etc.). As shown, browser 202 enables the user to visit Internet sites and view the various images 206, links 208, buttons 209, and other site features.

One embodiment of the anonymous shopping interface 200 provides an anonymous shopping toolbar 210 that includes the anonymous shopping tools. FIG. 2 shows one embodiment of an anonymous shopping toolbar 210 located as a bar at the bottom of browser 202. Of course, other configurations are possible. For example, anonymous shopping toolbar 210 may be located at the top or side of the browser 202. Additionally, the anonymous shopping toolbar 210 may comprise a separate window that overlays the browser 202 and is positionable and sizable according to user preference. Other embodiments of the anonymous shopping toolbar may comprise a separate icon or button on browser toolbar 204 that may activate a menu of anonymous shopping tools. Other configurations are possible.

Anonymous shopping toolbar 210 may comprise various tools to enable the anonymous shopping activities described herein. For example, tools may be provided to enable anonymous credit card accounts (e.g., credit tool 212), alias names (e.g., name tool 214) and anonymous delivery (e.g., delivery tool 216). Other tools may be provided as indicated by other tool 218.

The tools may take any acceptable form on the anonymous shopping toolbar 210. For example, tools may comprise buttons that may be activated by clicking with a pointer (e.g., a mouse cursor), pull-down menus, radio buttons, links, or other user selection devices.

Figure 3:
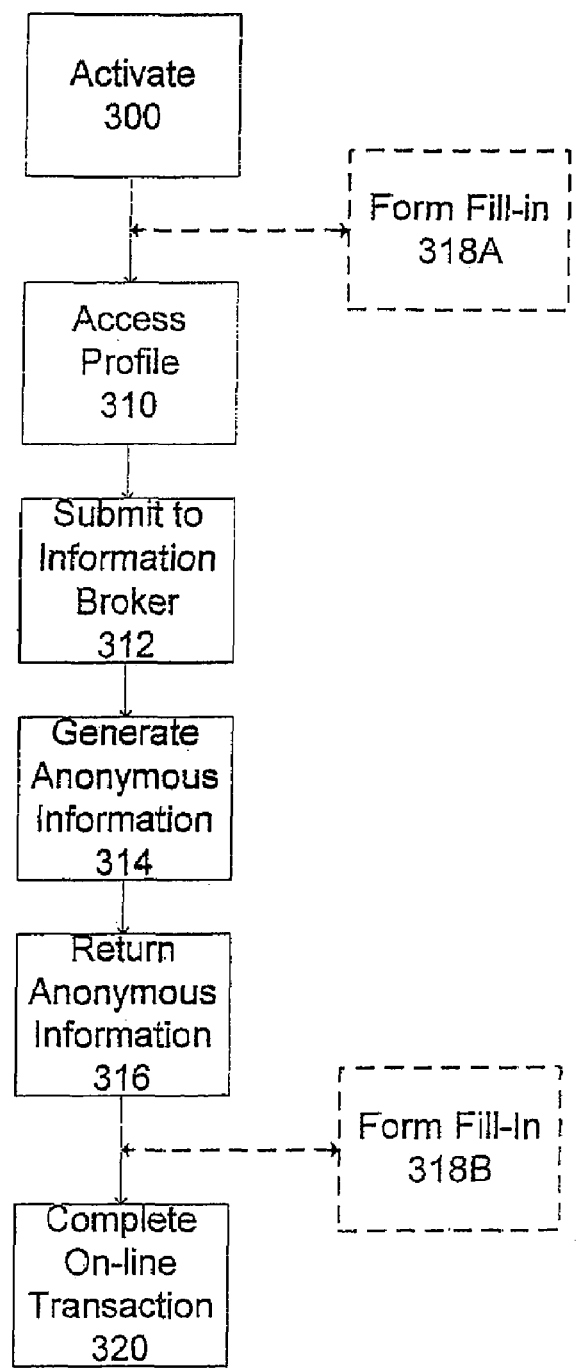
FIG. 3 is a schematic flow diagram illustrating an anonymous shopping method according to one embodiment of the invention.

FIG. 3 is a schematic flow diagram illustrating a method of anonymous shopping according to one embodiment of the invention. As shown, a user may activate an anonymous shopping tool (e.g., credit tool 212) at step 300. Activation of a tool may be accomplished by user selection of the tool (e.g., by clicking on or otherwise selecting the tool).

Selection of a tool may initiate access to the user's profile as indicated at step 310. As described herein, the user's profile may be stored at any convenient location and preferably includes user information that assists in completing an on-line shopping transaction.

At step 312, transaction related information is submitted to an information broker (e.g., information broker 110). Transaction related information may comprise purchase price, on-line merchant information (e.g., name, address, etc.), user profile information, and other transaction related information.

At step 314 the information broker 110 generates the anonymous information requested by the user to accomplish the transaction. For example, if information broker 110 is a credit card company, step 314 may comprise generating a single use credit card number for the user to submit to the on-line merchant. Other examples of anonymous information are described above.

At step 316 the anonymous information is returned so that it may be submitted to the on-line merchant. As described herein, in some embodiments the anonymous information may be returned to the user for the user to submit to the on-line merchant. In other embodiments, the anonymous information may be submitted to the on-line merchant directly. Other schemes are possible.

In some embodiments, the anonymous information may be submitted as part of a form fill-in procedure. This is indicated in FIG. 3 as steps 318A and 318B. The form fill-in steps may be accomplished at any convenient time in the process. For example, the form fill-in 318A may be accomplished upon activation (e.g., at 318A), after the information is returned from the information broker 110 (e.g., at step 318B), at a combination of the two times (e.g., some information filled at 318A and some at 318B) or at some other convenient time.

At step 320 the on-line shopping transaction is completed. For example, the information necessary to complete the on-line transaction, including the anonymous information, is submitted to the merchant.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for initiating anonymous on-line transactions, the method comprising:

displaying an anonymous shopping toolbar in a browser on a computer, the anonymous shopping toolbar associated with a credit card issuer and providing a user with an anonymous credit card option for the user to anonymously initiate an on-line transaction;

communicating a request for an anonymous credit card to the credit card issuer over a network connection that links the computer to the credit card issuer, the request communicated in response to the user selecting the anonymous credit card option, wherein the credit card issuer:

generates the anonymous credit card and links the anonymous credit card to the user's real credit card account in response to receiving the request for the anonymous credit card, the anonymous credit card having an anonymous transaction number that includes a credit card number and an expiration date based on a month and a year in which the on-line transaction occurs, issues a limit of one trillion unique anonymous transaction numbers per month, and uses one or more numbers from a first four numbers of the user's real credit card account in the anonymous transaction number in response to having issued the limit of one trillion unique anonymous transaction numbers in the month in which the on-line transaction occurs to create a new limit of an additional one trillion unique anonymous transaction numbers;

receiving the anonymous credit card at the computer over the network connection that links the computer to the credit card issuer; and initiating the on-line transaction over the network connection using the anonymous credit card.

2. The method of claim 1, the anonymous credit card available for a single use and having a purchase limit based on an amount of the on-line transaction.

3. The method of claim 2, wherein the request communicated to the credit card issuer includes the amount of the on-line transaction, information associated with the user's real credit card account, and an alias to be substituted for the user's real name.

4. The method of claim 1, the anonymous credit card further including an alias that substitutes for the user's real name.

5. A system for initiating anonymous on-line transactions, the system comprising:
 a graphical user interface that displays an anonymous shopping toolbar in a browser on a computer, the anonymous shopping toolbar associated with a credit card issuer and providing a user with an anonymous credit card option for the user to anonymously initiate an on-line transaction;
 a storage device that stores information corresponding to the user's real credit card account; and
 a network connection that links the computer to the credit issuer, wherein the computer:
  communicates a request for an anonymous credit card to the credit card issuer over the network connection in response to the user selecting the anonymous credit card option, wherein the credit card issuer:
   generates the anonymous credit card and links the anonymous credit card to the user's real credit card account in response to receiving the request for the anonymous credit card, the anonymous credit card having an anonymous transaction number that includes a credit card number and an expiration date based on a month and a year in which the on-line transaction occurs,
   issues a limit of one trillion unique anonymous transaction numbers per month, and
   uses one or more numbers from a first four numbers of the user's real credit card account in the anonymous transaction number in response to having issued the limit of one trillion unique anonymous transaction numbers in the month in which the on-line transaction occurs to create a new limit of an additional one trillion unique anonymous transaction numbers;
  receives the anonymous credit card over the network connection that links the computer to the credit card issuer; and
  anonymously initiates the on-line transaction over the network connection using the anonymous credit card.

6. The system of claim 5, the anonymous credit card available for a single use and having a purchase limit based on an amount of the on-line transaction.

7. The system of claim 5, the anonymous credit card further including an alias that substitutes for the user's real name.

* * * * *

UNITED STATES PATENT AND TRADEMARK OFFICE
CERTIFICATE OF CORRECTION

PATENT NO. : 7,640,187 B1  Page 1 of 1
APPLICATION NO. : 09/821040
DATED : December 29, 2009
INVENTOR(S) : Kelly Ervin Sonderegger et al.

It is certified that error appears in the above-identified patent and that said Letters Patent is hereby corrected as shown below:

On the title page:

In Item [75], change "Kelly Irvin Sonderegger" to "Kelly Ervin Sonderegger".

Signed and Sealed this

Twenty-third Day of February, 2010

David J. Kappos
*Director of the United States Patent and Trademark Office*